United States Patent
Beekmans et al.

(10) Patent No.: US 11,653,670 B2
(45) Date of Patent: *May 23, 2023

(54) VEGETARIAN CASING-LESS SMOKED SAUSAGE

(71) Applicant: Conopco Inc., Englewood Cliffs, NJ (US)

(72) Inventors: Luuk Christianus Hubertus Beekmans, Rotterdam (NL); Remco Johannes Koppert, Vlaardingen (NL); Marc Lemmers, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 288 days.

This patent is subject to a terminal disclaimer.

(21) Appl. No.: 16/954,542

(22) PCT Filed: Dec. 4, 2018

(86) PCT No.: PCT/EP2018/083472
§ 371 (c)(1),
(2) Date: Jun. 17, 2020

(87) PCT Pub. No.: WO2019/120982
PCT Pub. Date: Jun. 27, 2019

(65) Prior Publication Data
US 2020/0305460 A1    Oct. 1, 2020

(30) Foreign Application Priority Data
Dec. 21, 2017    (EP) .................................... 17209790

(51) Int. Cl.
*A23J 3/16* (2006.01)
*A23L 33/115* (2016.01)
(Continued)

(52) U.S. Cl.
CPC . *A23J 3/16* (2013.01); *A23J 3/08* (2013.01); *A23J 3/227* (2013.01); *A23L 33/115* (2016.08); *A23P 10/30* (2016.08)

(58) Field of Classification Search
CPC ...... A23J 3/16; A23J 3/08; A23J 3/227; A23L 33/115; A23P 10/30
(Continued)

(56) References Cited

U.S. PATENT DOCUMENTS

| | | | |
|---|---|---|---|
| 3,189,940 A | 6/1965 | Hughes | |
| 4,143,164 A | 6/1979 | Shanbhag et al. | |

(Continued)

FOREIGN PATENT DOCUMENTS

| | | |
|---|---|---|
| CN | 1615723 | 5/2005 |
| CN | 104738683 | 7/2015 |

(Continued)

OTHER PUBLICATIONS

Anonymous: "Casing (sausage)", Wikipedia, the free encyclopedia, Nov. 11, 2010 (Nov. 11, 2010), XP002788878, Retrieved from the Internet: URL:http://web.archive.org/web/20101111032606/https://en.wikipedia.org/wiki/Sausage_casing [retrieved on Feb. 13, 2019].

*Primary Examiner* — Brent T O'Hern
(74) *Attorney, Agent, or Firm* — N.V. Nederlandsch Octrooibureau

(57) ABSTRACT

The invention relates to a shaped vegetarian casing-less smoked sausage comprising:
a) 30-80 wt. % water;
b) 5-35 wt. % oil;
c) 2-25 wt. % protein selected from algal protein, bacterial protein, dairy protein, egg protein, fungal protein, plant protein, and combinations thereof;
d) 0-40 wt. % of one or more particulate ingredients selected from herbs, spices, vegetables and combinations thereof;
wherein the vegetarian sausage comprises less than 5 vol. % air bodies having an equivalent spherical diameter or more than 30 microns, as determined by means of micro computed tomography.

11 Claims, 2 Drawing Sheets

(51) Int. Cl.
*A23P 10/30* (2016.01)
*A23J 3/08* (2006.01)
*A23J 3/22* (2006.01)

(58) Field of Classification Search
USPC .......................................................... 426/656
See application file for complete search history.

(56) References Cited

U.S. PATENT DOCUMENTS

| | | | |
|---|---|---|---|
| 4,376,134 A * | 3/1983 | Kumar | A23J 3/227 |
| | | | 426/802 |
| 4,563,362 A | 1/1986 | Thomas et al. | |
| 7,070,827 B2 | 7/2006 | Cavallini et al. | |
| 2006/0204644 A1 * | 9/2006 | Cavallini | A23J 3/16 |
| | | | 426/512 |
| 2015/0056346 A1 | 2/2015 | Margolis | |
| 2015/0099053 A1 | 4/2015 | Kugitani et al. | |
| 2020/0337334 A1 * | 10/2020 | Beekmans | A23J 3/08 |

FOREIGN PATENT DOCUMENTS

| | | |
|---|---|---|
| CN | 104904871 | 9/2015 |
| CN | 106262949 | 1/2017 |
| EP | 1493337 | 1/2005 |
| WO | 9702760 | 1/1997 |
| WO | 02056701 | 7/2002 |

\* cited by examiner

VEGETARIAN CASING-LESS SMOKED SAUSAGE

FIELD OF THE INVENTION

The present invention relates to a shaped vegetarian casing-less smoked sausage comprising:
- 30-80 wt. % water;
- 5-35 wt. % oil;
- 2-25 wt. % protein selected from algal protein, bacterial protein, dairy protein, egg protein, fungal protein, plant protein, and combinations thereof;
- 0-40 wt. % of one or more particulate ingredients selected from herbs, spices, vegetables and combinations thereof.

BACKGROUND OF THE INVENTION

Meat is considered the highest quality protein source, not only due to its nutritional characteristics, but also for its appreciated taste. Meat is nutritious, because meat protein contains all essential amino acids for humans. In addition, meat comprises essential vitamins, such as vitamin B12, and is rich in minerals. Meat proteins also greatly contribute to food characteristics by imparting specific functionalities, such as, appearance, texture, and mouthfeel.

However, from a health point of view, an excessive intake of meat products cannot be recommended, because meat contains cholesterol and a high proportion of saturated fatty acids.

Further, due to animal diseases, such as mad cow disease, global shortage of animal protein, a growing consumer demand for religious (halal or kosher) food and for economic reasons, there is an increasing interest in vegetarian meat products that are based on non-meat proteins.

U.S. Pat. No. 4,376,134 describes a process for the production of a sausage analogue, said process consisting essentially of:
- providing an aqueous mixture of ingredients comprising 60-80 wt. % water, 15-30 wt. % flavors, 0-6.0 wt. % spices, 0-3.0 wt. % coloring agents;
- providing a dry mixture of ingredients selected from the group consisting of 0-7 wt. % egg white solids, 0-5 wt. % non-fat dry milk, 0-8 wt. % sodium caseinate, 0-5 wt. % sugar and combinations thereof;
- admixing textured protein with the aqueous mixture thereby forming a first admixture;
- forming a second admixture by admixing with said first admixture, 5-30 wt. % of a blend of fats and oils wherein said blend contains equal amounts of (i) a high melting point fat having a melting point in the range 90-110° F., (ii) an intermediate melting point fat having a melting point in the range 70-90° F., and (iii) a low melting point fat or oil which is a liquid at room temperature;
- admixing the dry mixture with the second admixture thereby forming a third admixture;
- adjusting the third admixture to a temperature of 60° F. or lower.

EP-A 1 493 337 describes a vegetable base meat analogue comprising water, oil, modified gluten and other ingredients. Example 4 describes the preparation of an emulsion base comprising among others ice/water, vegetable protein product, modified gluten and soy/canola salad oil. The flavoured emulsion base is stuffed into water impermeable or semi permeable casings which may be removed later.

WO 02/056701 describes a native vegetable protein product which is highly soluble in water and forms a gel with mild heat treatment. Example 5 describes the preparation of two frankfurter-like products having a vegetable oil content of 0.5% and 3%. These products were prepared by filling the vegetable sausage mass into frankfurter casing, dipping into liquid smoke and heat processing in a smokehouse.

U.S. Pat. No. 4,143,164 describes a process for preparing a bacon analog comprising at least one layer of a fat phase and at least one layer of a lean phase forming a layered mass. The preparation of the lean phase comprises a deaeration step.

WO 97/02760 describes a process for the production of a formulated emulsion product which has a meat-like appearance. The process comprises the provision of an emulsion comprising 10-25% protein, 5-25% fats and 60% water. The emulsion is optionally deaerated.

US 2015/0099053 describes an oil-in-water-type emulsion gel food that is obtained by gelling an oil-in-water-type emulsion slurry containing 10-60 wt. % of oil droplets having a particle diameter of 50-800 µm.

U.S. Pat. No. 3,189,940 describes a vacuum-pressure apparatus for transporting and deaerating sausage batter.

Meat-based sausages are commonly produced by stuffing meat batter in an edible casing. However, these casings are made from animal material (intestine casing or collagen casing) and are therefore unsuited for use in the preparation of vegetarian sausages. Alternative casings are available for the manufacture vegetarian sausages in the form of cellulose or synthetic polymer based casings. However, these casings are generally inedible and have to be removed before consumption. Usually this is already done during the manufacturing process.

The removal of inedible casings during the manufacture of vegetarian sausages poses a challenge as the casing should be removed cleanly. In other words, it is important that the casing can be removed easily and without taking out edible material from the vegetarian sausage.

SUMMARY OF THE INVENTION

The inventors have discovered that casing-less smoked vegetarian sausages can be produced very easily, with minimal product loss and with minimal surface damage when the casing is removed, if the volume of air that is entrained in the vegetarian meat mass is reduced to a low level before stuffing the mass into a cellulose casing, smoking treatment and removal of the casing. The vegetarian sausage so obtained is characterized by a very low level of entrained air and an attractive, undamaged, smooth surface.

Accordingly, a first aspect of the present invention relates to a shaped vegetarian casing-less smoked sausage comprising:
a) 30-80 wt. % water;
b) 5-35 wt. % oil;
c) 2-25 wt. % protein selected from dairy protein, egg protein, fungal protein, plant protein, and combinations thereof;
d) 0-40 wt. % of one or more particulate ingredients selected from herbs, spices, vegetables and combinations thereof;
wherein the vegetarian sausage comprises less than 5 vol. % air bodies having an equivalent spherical diameter of more than 30 microns, as determined by means of micro computed tomography.

A second aspect of the invention relates to a process of preparing the shaped vegetarian casing-less smoked sausage according to the present invention, said process comprising the steps of:
i) mixing oil, water and protein to a vegetarian sausage mass;
ii) stuffing the vegetarian sausage mass into a cellulose casing;
iii) subjecting the encased mass to a smoke treatment;
iv) removing the casing to obtain a cylindrically shaped vegetarian sausage; and
v) packaging the cylindrically shaped vegetarian sausage;
wherein entrained air is removed from the vegetarian sausage mass before said mass is stuffed into the casing by reducing pressure.

The aforementioned process can suitably be used to prepare e.g. vegetarian sausages and vegetarian patties.

A third aspect of the invention relates to a method of preparing a ready-to-eat vegetarian sausage, said method comprising heating the casing-less smoked vegetarian sausage according to the present invention to a temperature of at least 60° C.

DETAILED DESCRIPTION OF THE INVENTION

Figure 1:
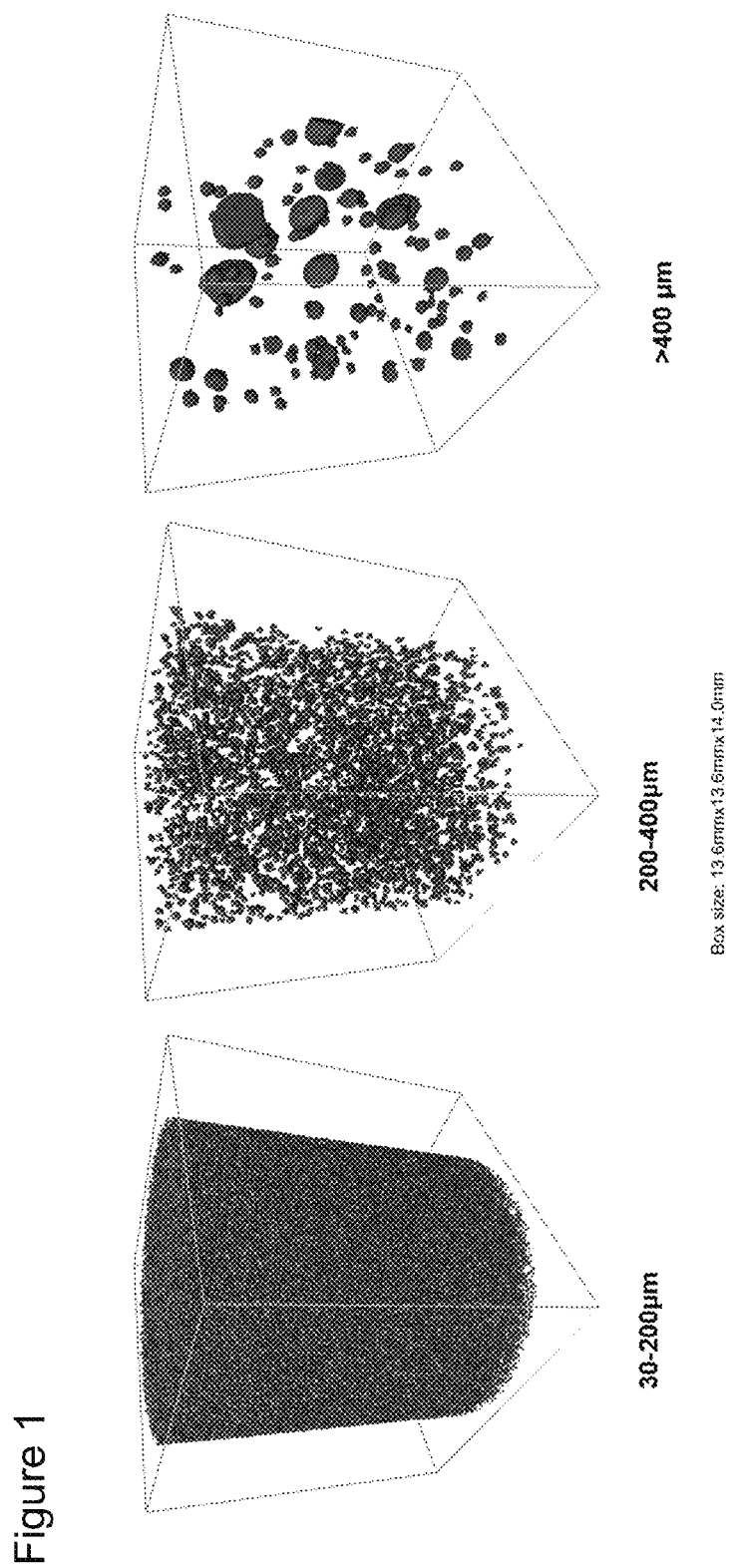
FIG. 1 shows size labelled binary images that were produced by a micro CT scan for a first sausage.

The present invention relates to a shaped vegetarian casing-less smoked sausage comprising:
a) 30-80 wt. % water;
b) 5-35 wt. % oil;
c) 2-25 wt. % protein selected from algal protein, bacterial protein, dairy protein, egg protein, fungal protein, plant protein, and combinations thereof;
d) 0-40 wt. % of one or more particulate ingredients selected from herbs, spices, vegetables and combinations thereof;
wherein the vegetarian sausage comprises less than 5 vol. % air bodies having an equivalent spherical diameter of more than 30 microns, as determined by means of micro computed tomography.

The term "vegetarian sausage" as used herein refers to a sausage that does not contain meat, meat fat or meat protein that is obtained from animals, including fish. The vegetarian sausage of the present invention can contain fat or protein obtained from milk or eggs.

The term "shaped" as used herein in relation to the vegetarian sausage means that the vegetarian sausage has been prepared in a predefined form that is retained after preparation. Shaping of the vegetarian sausage may be achieved by e.g. extrusion (and cutting) or moulding (e.g. by stuffing a mass of vegetarian sausage in a casing).

The term "air bodies" as used herein should be understood as referring to enclosed areas within the vegetarian sausage that contain gas. This gas can be air, but is can also be an inert gas, e.g. if the vegetarian sausage is produced under an inert atmosphere (e.g. nitrogen).

Whenever reference is made to the protein content of the vegetarian sausage, unless indicated otherwise, this does not include protein that is contained in the one or more particulate ingredients.

The volume percentage of air bodies having an equivalent spherical diameter of more than 30 micrometer, expressed as a percentage of the volume of the vegetarian sausage, is determined by means of micro computed tomography using the procedure that is described in the Examples.

The term "oil" as used herein refers to glycerides selected from triglycerides, diglycerides, monoglycerides, phosphoglycerides and combinations thereof. The term "oil" encompasses oils that are liquid at ambient temperature as well as oils that are solid or semi-solid at ambient temperature.

The solid fat content at a temperature of x degrees Celsius ($N_x$) can suitably be determined using ISO 8292-1 (2012).

Whenever reference is made to the water content of the vegetarian sausage, this includes both free and bound water.

The shaped vegetarian sausage preferably comprises less than 4 vol. %, more preferably less than 3 vol. %, most preferably less than 2 vol. % air bodies having an equivalent spherical diameter of more than 10 microns, as determined by means of micro computed tomography.

The shaped vegetarian sausage typically has a unit weight in the range of 5-500 grams, more preferably of 10-450 grams and most preferably of 15-400 grams.

The combination of water, oil, the protein and the one or more particulate ingredients typically constitutes at least 80 wt. %, more preferably at least 85 wt. % and most preferably at least 88 wt. % of the shaped vegetarian sausage.

The water content of the vegetarian sausage preferably is in the range of 40 wt. % to 70 wt. %, more preferably of 50 wt. % to 65 wt. %.

The oil content of the product is preferably in the range of 10 wt. % to 32 wt. %, more preferably 15 wt. % to 30 wt. %.

According to a particularly preferred embodiment, the oil contained in the product has a solid fat content at 20 degrees Celsius ($N_{20}$) of 1.5-20%, more preferably of 2-10% and most preferably of 2.5-8%. The inventors have found that in comparison to oils that are completely liquid at 20 degrees Celsius, oils containing some solid fat at 20 degrees Celsius improve the storage stability of the shaped vegetarian sausage.

Oils containing solid fat at the temperature at which the oil is mixed with the other ingredients in the preparation of the shaped vegetarian sausage offer the advantage that they are more viscous than oils that do not contain any solid fat at that temperature. This higher viscosity is advantageous in the preparation of the vegetarian sausage as it counteracts break-up of the oil into small droplets and thus facilitates preparation of a product containing large oil droplets.

According to another preferred embodiment, the oil in the product has a solid fat content at 30 degrees Celsius ($N_{30}$) of 1-10%, more preferably of 1.5-8% and most preferably of 2-7%.

The inventors have discovered that the appearance of shaped vegetarian sausages, especially after cutting of the product, is greatly improved if the product comprises a substantial amount of large oil droplets. Accordingly, in a preferred embodiment, the vegetarian sausage contains at least 4 vol. % of oil droplets having an equivalent spherical diameter in the range of 100 micrometer to 1,000 micrometer as determined by means of micro computed tomography as described in the Examples.

The shaped vegetarian sausage preferably contains at least 5 vol. %, more preferably at least 6 vol. % of oil droplets having an equivalent spherical diameter in the range of 100 micrometer to 1,000 micrometer as determined by means of micro computed tomography.

Preferably, the shaped vegetarian sausage contains at least 1 vol. %, more preferably at least 2 vol. % of oil droplets having an equivalent spherical diameter in the range of 200 micrometer to 900 micrometer as determined by means of micro computed tomography.

The oil in the shaped vegetarian sausage preferably contains 80-98 wt. % of a liquid vegetable oil selected from the group of sunflower oil, soybean oil, rapeseed oil, cottonseed oil, maize oil, olive oil, and combinations thereof and 2-20 wt. % of a high melting oil selected from hydrogenated vegetable oil, palm stearin, palm mid fraction, palm kernel stearin, coconut stearin, butter oil, butter stearin and combinations thereof. More preferably, the oil contains 90-97.5 wt. % of the liquid vegetable oil and 2.5-10 wt. % of the high melting oil.

The shaped vegetarian sausage preferably contains 4-20 wt. % protein, more preferably 6-18 wt. % protein. Preferably, the shaped vegetarian sausage contains at least 4 wt. %, more preferably at least 6 wt. % protein selected from egg white protein, soy protein, wheat protein, oat protein, bran protein and combinations thereof. Even more preferably, the product contains at least 4 wt. %, more preferably at least 6 wt. % protein selected from egg white protein and wheat protein.

According to a particularly preferred embodiment, the product comprises a combination of plant protein and egg protein, said plant protein preferably being selected from the group consisting of soy protein, cereal protein, rapeseed protein, cottonseed protein, sunflower protein, sesame protein, legume protein, lupin protein, potato protein and algae protein and combinations thereof; and said egg protein being selected from egg yolk protein, egg white protein and combinations thereof. Preferred plant proteins are soy protein, wheat protein, oat protein, bran protein and combinations thereof. More preferred plant proteins are soy protein, wheat protein and combinations thereof. The egg protein employed preferably is egg white protein.

The vegetarian sausage preferably contains 1-20 wt. %, more preferably 2-15 wt. % and even more preferably 3-10 wt. % of the one or more particulate ingredients.

Examples of other ingredients that may suitably be incorporated in the shaped vegetarian sausage of the present invention include salt, sugars, acids, polysaccharides, vitamins, minerals, flavourings, colourings, preservatives and emulsifiers.

Typically, the vegetarian sausage contains 0.3-8 wt. %, more preferably 0.4-5 wt. % of salt selected from sodium chlorides, potassium chloride and combinations thereof.

A particularly preferred embodiment of the shaped vegetarian sausage is a product comprising:
a) 50-65 wt. % water;
b) 15-30 wt. % oil;
c) 6-18 wt. % protein selected from dairy protein, egg protein, fungal protein, plant protein, and combinations thereof;
d) 2-15 wt. % of one or more particulate ingredients selected from herbs, spices, vegetables and combinations thereof;
wherein the vegetarian sausage comprises less than 3 vol. % air bodies having an equivalent spherical diameter or more than 30 microns, as determined by means of micro computed tomography. Especially preferred is such a product, wherein the oil has a solid fat content at 20 degrees Celsius ($N_{20}$) of 2.5-8%.

Another aspect of the invention relates to a process of preparing a shaped vegetarian sausage according to the present invention, said process comprising the steps of:

i) mixing oil, water and protein to a vegetarian sausage mass;
ii) stuffing the vegetarian sausage mass into a cellulose casing;
iii) subjecting the encased mass to a smoke treatment;
iv) removing the casing to obtain a cylindrically shaped vegetarian sausage; and
v) packaging the cylindrically shaped vegetarian sausage;
wherein entrained air is removed from the vegetarian sausage mass before said mass is stuffed into the casing by reducing pressure.

The stuffed casing typically is cylindrically shaped. The stuffing of the casing may be done by extruding the sausage mass into a long tube of casing. After stuffing, this tube may be cut into cylindrical pieces. These pieces may be bent so as to create U-shaped or circular shapes. It is also possible to employ pre-shaped casings in order to, for instance, produce U-shaped sausages.

The protein is preferably in the form of a powder when it is mixed with the water.

Preferably, the mixing of the protein and water is carried out in a bowl chopper.

A vegetarian sausage comprising a substantial amount of large oil droplets can be produced by first preparing a proteinaceous slurry, followed by mixing said slurry with a substantial quantity of oil. By adding the oil after the protein has been thoroughly mixed with water, break-up of the oil droplets to droplet sizes of substantially less than 100 μm can be minimised because the high viscosity of the proteinaceous slurry prevents such break-up and because not much shear is required to homogeneously disperse the large oil droplets through the proteinaceous slurry. As explained herein before, break-up into small droplets can also be counteracted by employing an oil that contains some solid fat when it is mixed the slurry.

The casing employed in the present process is a cellulose casing. Cellulose casings offer the advantage that they are gas permeable. Gas permeability of the casing makes it possible to produce a smoked vegetarian sausage by subjecting the encased mass to a smoke treatment.

In a particularly preferred embodiment, entrained air is removed by reducing the pressure to less than 0.5 atmosphere, more preferably to less than 0.4 atmosphere and most preferably to less than 0.3 atmosphere.

Typically, at least 50 vol. %, more preferably at least 60 vol. % and most preferably at least 70 vol. % of the entrained air is removed from the vegetarian sausage mass in the present process.

In yet another preferred embodiment of the present process, the casing containing the vegetarian sausage mass is subjected to a smoking treatment after the removal of entrained air.

In a preferred embodiment, the packaged vegetarian sausage is pasteurised or sterilised within the sealed package.

Prior to the removal of the casing, shaped vegetarian sausage is preferably heated to a temperature of at least 60 degrees Celsius, more preferably of at least 70 degrees for at least 1 minute to denature proteinacous components and to thereby form a solidified product. The casing can easily be removed after the vegetarian sausage has been solidified by the heat treatment.

The packaging of the vegetarian sausage or the vegetarian patty in a sealed package may suitably be done by packaging these products in a vacuum bag made of a synthetic packaging film (e.g. polyethylene, polypropylene, polyester, polyamide), followed by sealing of the bag.

Yet another aspect of the invention relates to a method of preparing a ready-to-eat shaped vegetarian sausage, said method comprising heating a shaped vegetarian sausage according to the present invention to an internal temperature of at least 60° C. The heating of the vegetarian sausage can be done in various ways. Examples of suitable heating methods include contacting with hot (e.g. boiling) water, microwave heating, shallow frying and deep frying.

The invention is further illustrated by the following non-limiting examples.

EXAMPLES

Example 1

Analysis of Gas Distribution by Means of Micro Computed Tomography

Small cylinders of the samples were obtained by punching an apple corer into the vegetarian sausage surface. The size was approximately 14 mm in diameter and the height ranges from 30-40 mm. A plastic tube with an inner diameter of 14 mm was used as a protective container during scanning (to avoid loss of moisture).

Samples were imaged using a Skyscan 1172-G desktop micro-CT system with a 100 kV X-ray source (10 W, 20-100 kV, 0-250 µA, <5µ spot size) and a 11 Mp Ximea X-ray detector (4000*2664 pixels). The following settings were applied: Source 60 kV/167 µA, pixel size 4.4 µm, step size of 0.20° over 360 degrees and frame averaging of 3. No binning was used. The average scan time was about 2:30 hours per scan, and yields 1800 projection images/scan. The samples were scanned using 3 scans, connected in the vertical direction to increase the axial field-of-view (oversized scan) and subsequently merged together during the reconstruction.

A stack of ~6800 horizontal cross sections with a size of ~3700×3700 pixels was obtained after tomographic reconstruction of the projection images. A beam hardening correction of 100%, ring artefact correction of 20 were selected. Smoothing was set to 4.

For image analysis and 3D visualisation of the micro-CT images, AvizoFire 9.2 software from ThermoFisher—Visualization Sciences Group was used. The sample holder was removed by using binary masking. Air was identified using grey level thresholding: creating a binary image by selecting pixels that belong to true foreground regions with intensities higher than a predefined value (threshold) and background regions with intensities lower than this value. After thresholding, the following image processing steps were used: i) separation of touching particles, ii) removing particles touching the lower and upper edge, and iii) generation of a size distribution and calculation of mean particle diameters. For segmentation, a watershed transform of the Euclidean distance map was used. In Avizo Fire a build in function was used combining both procedures.

The size of the identified air bodies is expressed as the equivalent spherical diameter. This is the diameter of a sphere having the same volume as the air body. The volume of the air bodies equals the number of pixels within the air body, which is straightforwardly determined by counting. The equivalent spherical diameter is not only used for air bodies approaching a spherical shape, but also for irregular air bodies.

Preparation of Sausages

Sausages were prepared on the basis of the recipe shown in Table 1.

TABLE 1

| Ingedient | Wt % |
|---|---|
| Water | 58.3 |
| Rapeseed oil | 24.6 |
| Salt | 0.6 |
| Protein mix [1] | 11.5 |
| Taste giving ingredient mix [2] | 4.4 |
| Colorant | 0.6 |
| TOTAL | 100 |

[1] Mix of wheat protein and (predominantly) egg protein
[2] Herbs, spices and flavouring Sausages were prepared according to the following procedure:
Water, salt and protein mix were mixed in a Stephan Mixer (UMC 5 electronic, standard 2 knives mixing tool) and mixed for 2 minutes at 1000 rpm, while the wall scraper speed was set at 55 rpm. Mixing was done at ambient temperature.
Oil, colorant and taste giving ingredient mix were added and mixed again for 2 minutes at 1000 rpm, while the wall scraper speed was set at 55 rpm. Mixing was done at ambient temperature.
The pressure during mixing was varied, see results table 2.
The resulting vegetarian meat product mass was transferred to a piping bag and filled into synthetic polymer casing (calibre 32, NaloSlim® Kranz, Kalle GmbH).
The filled casings were pasteurized for 45 minutes at 85° C.
Samples were stored in the fridge before evaluation the next day.
The sausage samples were evaluated the next day for the appearance of the outside, after removal of the non-edible casing. Evaluation was performed in the following way:
Sausages were taken out of the fridge to reach room temperature.
The sausages were cut into 5 cm straight pieces of cylindrical shape (ends were cut-off if necessary).
Samples were weight, after which the casing was removed by making a minor incision at the edge of the sample, and subsequently peeling the casing from the sausage by hand.
The sausage material sticking to the casing was scraped off using the backside of a knife and weight.
The appearance of the outside of the peeled sausage was evaluated visually for gloss, smoothness and air bubbles The results of the evaluation are given in table 2:

TABLE 2

|  | Sausage 1 | | Sausage 2 | | Sausage 3 | | Sausage 4 | |
|---|---|---|---|---|---|---|---|---|
| Mixing pressure | ambient | | −50% | | −75% | | −90% | |
| Vol % air: (≥30 µm) | 19% | | 14% | | 6% | | 0.5% | |
| Sample weight (g) | 37.0 | 39.9 | 43.1 | 42.1 | 46.3 | 48.6 | 51.8 | 50.4 |
| Residue on casing (g) | 0.3 | 0.3 | 0.3 | 0.3 | 0.2 | 0.3 | 0 | 0 |
| Residue on casing (wt %) | 0.8% | 0.8% | 0.6% | 0.6% | 0.5% | 0.6% | 0% | 0% |

TABLE 2-continued

|  | Sausage 1 | Sausage 2 | Sausage 3 | Sausage 4 |
|---|---|---|---|---|
| Appearance sausage after casing removal | not smooth, glossy and matte areas, lot of air bubbles | not smooth, glossy and matte areas, some of air bubbles | not smooth, matte appearance, some air bubbles | smooth, glossy, almost no air bubbles |

Figure 2:
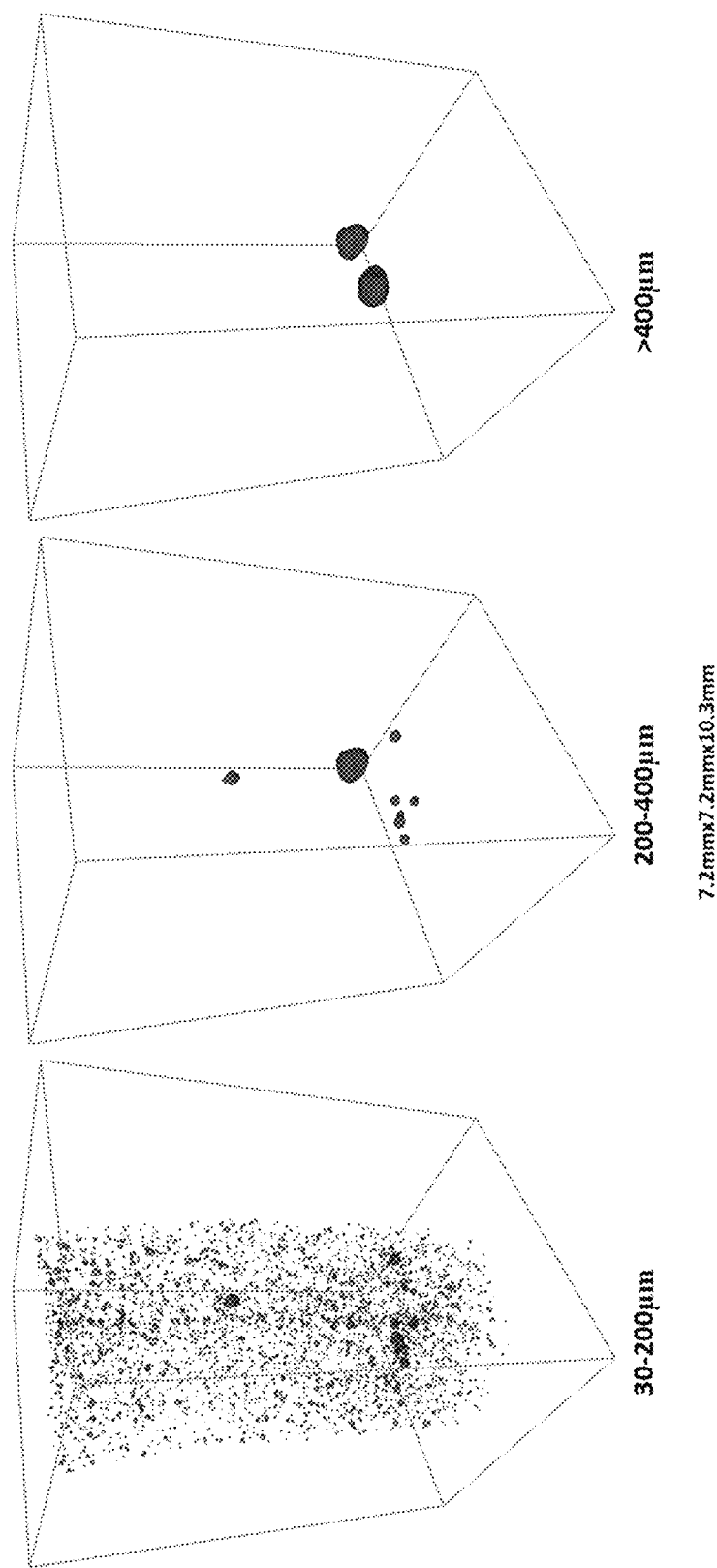
FIG. 2 shows size labelled binary images that were produced by a micro CT scan for a second sausage.

FIGS. 1 and 2 show size labelled binary images that were produced by the micro CT scan for Sausage 2 and 4, respectively. FIG. 1 shows the air bodies present in sausage 2. FIG. 2 shows the air bodies present in sausage 4. Both in FIG. 1 and FIG. 2, the air bodies having an equivalent spherical diameter in the range of 30-200 micrometer, 200-400 micrometer and >400 micrometer, are shown separately.

Example 2

Analysis of oil distribution by means of micro computed tomography Small cylinders of sausage samples were obtained by punching an apple corer into the (vegetarian) sausage surface. The size was approximately 5 mm in diameter and the height ranged from 7-10 mm. A plastic tube with an inner diameter of 6 mm was used as a protective container during scanning (to avoid loss of moisture). A micro-positioning stage was used to achieve exact positioning of the sample tube in the middle of the scanning field.

Samples were imaged using a Skyscan 1172-G desktop micro-CT system with a 100 kV X-ray source (10 W, 20-100 kV, 0-250 µA, <5 p spot size) and a 11 Mp Ximea X-ray detector (4000*2664 pixels). The following settings were applied: Source 60 kV/167 µA, pixel size 1.82 µm, step size of 0.20° over 360 degrees and frame averaging of 3. No binning was used. The average scan time was about 2 hours and 40 minutes per scan, and yields 1800 projection images/scan. The samples were scanned using 2 scans, connected in the vertical direction to increase the axial field-of-view (oversized scan) and subsequently merged together during the reconstruction.

A stack of approximately 6500 horizontal cross sections with a size of approximately 3700×3700 pixels was obtained after tomographic reconstruction of the projection images. A beam hardening correction of 40%, ring artefact correction of 20 were selected. Smoothing was set to 4.

For image analysis and 3D visualisation of the micro-CT images, AvizoFire 9.2 software from ThermoFisher—Visualization Sciences Group was used. The sample holder was removed by using binary masking. Oil was identified using grey level thresholding: creating a binary image by selecting pixels that belong to true foreground regions with intensities higher than a predefined value (threshold) and background regions with intensities lower than this value. After thresholding, the following image processing steps were used: i) separation of touching particles, ii) removing particles touching the lower and upper edge, and iii) generation of a size distribution and calculation of mean particle diameters. For segmentation, a watershed transform of the Euclidean distance map was used. In Avizo Fire a build in function was used combining both procedures.

The size of the identified oily particles is expressed as the equivalent spherical diameter. This is the diameter of a sphere having the same volume as the oily particle. The volume of the oily particles equals the number of pixels within the particle, which is straightforwardly determined by counting. The equivalent spherical diameter is not only used for particles approaching a spherical shape, but also for irregular particles.

Preparation of Sausages

Smoked sausages were prepared on the basis of the recipe shown in Table 1.

TABLE 1

| Ingredients | Wt. % |
|---|---|
| Water | 57.2 |
| Rapeseed oil | 24.5 |
| High melting fat [1] | 0.9 |
| Salt | 0.6 |
| Protein mix [2] | 11.8 |
| Taste giving ingredient mix [3] | 4.5 |
| Colourants | 0.7 |
| TOTAL | 100.0 |

[1] Fully hardened palm oil
[2] Mixture of wheat protein and (predominantly) egg white protein
[3] Herbs, spices and flavouring Sausages were prepared by the following procedure:
Half of the total amount of oil and the full amount of high melting fat were heated and subsequently mixed to make sure all the high melting fat was homogeneously distributed throughout the oil phase. This blend was quiescently cooled to room temperature overnight and used the next day.
All ingredients except the oil blend were added to the water and mixed in a bowl chopper (65 L, LASKA, Austria, fitted with 6 knives of 4-cut shape) at a reduced pressure of 0.4 bars and at ambient temperature until visually homogeneous.
The first half of the oil was added and mixed at a pressure of 0.4 bars at medium shear setting, at ambient temperature and until visually homogeneous.
The oil blend was added and mixed at a pressure of 0.4 bars at low shear setting, at ambient temperature and until visually homogeneous.
The vegetarian meat product mass was transferred into non-edible cellulose casings to obtain a sausage shaped product.
The sausage shaped product was pasteurized at 85° C. for 45 minutes.
The sausages were dried for 90 minutes at 46° C.
The sausages were smoked in a smoking chamber for 90 minutes at 46° C.
After smoking the cellulose casing was removed by hand.
The sausages were vacuum sealed in plastic.
It was found that the cellulose casings could be removed easily and that very little product was removed together with the casings.
The distribution of air and oil within the sausages so prepared was analysed by means of micro computed tomography.
The micro CT analysis showed that the sausages contained 1.6 vol. % air. It further showed that the sausages contained 7.9 vol. % of oil droplets having an equivalent spherical diameter of more than 100 microns and 1.9 vol. % of oil droplets having an equivalent spherical diameter of more than 300 microns.

Comparative Example A

Smoked sausages were prepared on the basis of the recipe shown in Table 2.

TABLE 2

| Ingredients | Wt. % |
| --- | --- |
| Water | 58.8 |
| Rapeseed oil | 25.2 |
| Salt | 0.6 |
| Protein mix [1] | 9.8 |
| Taste giving ingredient mix [2] | 4.6 |
| Colourants | 0.7 |
| Polysaccharides [3] | 0.3 |
| TOTAL | 100.0 |

[1] Mixture of wheat protein and (predominantly) egg white protein
[2] Herbs, spices and flavouring
[3] Contains predominantly konjac gum and some carrageenan The sausages were prepared in the same way as the sausages in Example 2, except that no vacuum was applied during mixing and that the medium shear setting was applied also after the second oil addition step.

This time it was found that when peeling the cellulose casings by hand a significant amount of product was removed together with the casings, leading to unattractive looking sausages.

The micro CT analysis showed that the sausages contained 15.7 vol. % air. It further showed that the sausages contained less than 0.1 vol. % of oil droplets having an equivalent spherical diameter of more than 100 micrometer.

Example 3

The sausages described in Example 2 and Comparative Example A were evaluated by a trained sensory panel.

The panel had been trained to score the intensity of attributes on an absolute scale ranging from 0-15. Using absolute scaling enables comparison of attribute scores.

The trained sensory panel consisted of 12 panel members, selected according to ISO 8586 standards. The samples were offered sequential monadic and blind with 3-digit codes. White light conditions were applied. A mean score was calculated, for each attribute for every product. The samples were heated in a vacuum-bag for 15 minutes in hot water (90° C.). After heating, the samples were offered directly to the panelists.

The panelists cut the sausage, using sharp and similar knives, and visually evaluated the inside of the sausage for the degree of visible moisture from either fat and or water. A lower score indicates less visible moisture and a higher score indicates more visible moisture.

After visual evaluation by the panelists, the samples were tested for their organoleptic attributes. One of the texture attributes is labelled as 'dry/rough after feel'. This attribute describes the degree of a dry/rough after feel and is judged after the product has left the mouth. A lower score indicates less dry/rough after feel in the mouth, while a higher score indicates a more dry/rough after feel in the mouth.

As a reference sample the panel also evaluated a commercial pork meat sausage, type "Unox® magere rookworst" (Unox® light smoked sausage).

The average panel scores for the three sausages tested are shown in Table 3.

TABLE 3

| | Unox ® light smoked sausage | Sausage of Example 2 | Sausage of Comparative Example A |
| --- | --- | --- | --- |
| Moist appearance | 8.2 * | 8.0 * | 3.1 |
| Dry/rough after feel | 3.2 | 3.8 | 5.6 |

* Not significantly different.

The invention claimed is:

1. A shaped vegetarian casing-less smoked sausage comprising:
   a) 30-80 wt. % water;
   b) 5-35 wt. % oil;
   c) 2-25 wt. % protein selected from algal protein, bacterial protein, dairy protein, egg protein, fungal protein, plant protein, and combinations thereof;
   d) 0-40 wt. % of one or more particulate ingredients selected from herbs, spices, vegetables and combinations thereof;
   wherein the vegetarian casing-less smoked sausage comprises less than 5 vol. % air bodies having an equivalent spherical diameter or more than 30 microns, as determined by means of micro computed tomography,
   wherein the casing-less smoked sausage has been subjected to a smoke treatment while encased in a gas permeable cellulose casing, with the cellulose casing being subsequently removed.

2. The vegetarian casing-less smoked sausage according to any claim 1, wherein the vegetarian casing-less smoked sausage contains at least 4 vol. % of oil droplets having an equivalent spherical diameter in the range of 100 micrometer to 1,000 micrometer as determined by means of micro computed tomography.

3. The vegetarian casing-less smoked sausage according to claim 1, wherein the vegetarian casing-less smoked sausage comprises less than 3 vol. % air bodies having an equivalent spherical diameter of more than 30 microns, as determined by means of micro computed tomography.

4. The vegetarian casing-less smoked sausage according to claim 1, comprising 40-70 wt. % water.

5. The vegetarian casing-less smoked sausage according to claim 1, comprising 10-32 wt. % oil.

6. The vegetarian casing-less smoked sausage according to any one of the preceding claims, wherein the oil has a solid fat content at 20 degrees Celsius (N20) of 1.5-30%.

7. The vegetarian casing-less smoked sausage according to claim 1, wherein the oil contains 80-98 wt. % of a liquid vegetable oil selected from the group of sunflower oil, soybean oil, rapeseed oil, cottonseed oil, maize oil, olive oil, and combinations thereof and 2-20 wt. % of a melting oil selected from hydrogenated vegetable oil, palm stearin, palm kernel stearin, coconut stearin, butter oil, butter stearin and combinations thereof.

8. The vegetarian casing-less smoked sausage according to claim 1, comprising 4-20 wt. % protein.

9. The vegetarian casing-less smoked sausage according to claim 1, comprising 1-20 wt. % of the one or more particulate ingredients.

10. The vegetarian casing-less smoked sausage according to claim 1, said vegetarian sausage comprising:
    a) 50-65 wt. % water;
    b) 15-30 wt. % oil;
    c) 6-18 wt. % protein selected from dairy protein, egg protein, fungal protein, plant protein, and combinations thereof;

d) 2-15 wt. % of one or more particulate ingredients selected from herbs, spices, vegetables and combinations thereof;

wherein the vegetarian casing-less smoked sausage comprises less than 3 vol. % air bodies having an equivalent spherical diameter or more than 30 microns, as determined by means of micro computed tomography.

11. The vegetarian casing-less smoked sausage according to any claim 1, wherein entrained air is removed from the vegetarian casing-less smoked sausage by reducing pressure to less than 0.5 atmosphere during mixing of the water, the protein, and the one or more particulate ingredients.

* * * * *